Dec. 8, 1936. C. R. SODERBERG 2,063,707
METHOD OF MANUFACTURING TURBINE NOZZLES
Filed June 14, 1935
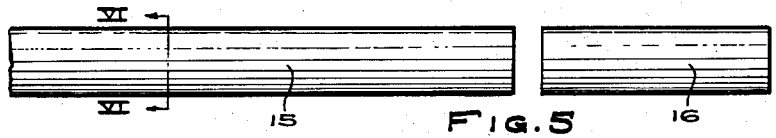
FIG. 5.  FIG. 6.
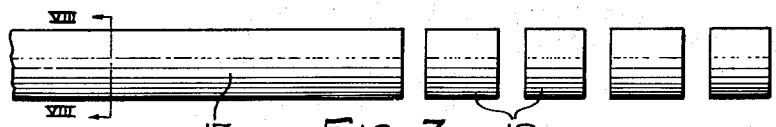
FIG. 7.  FIG. 8.
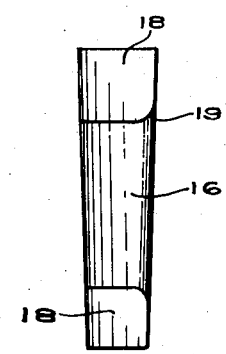
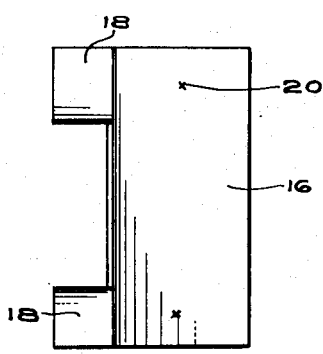
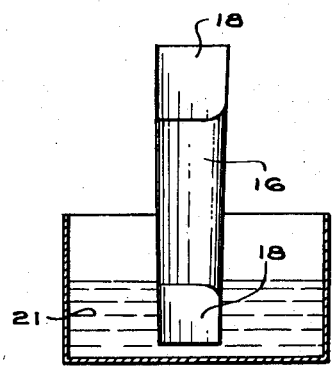
FIG. 9.  FIG. 10.  FIG. 11.
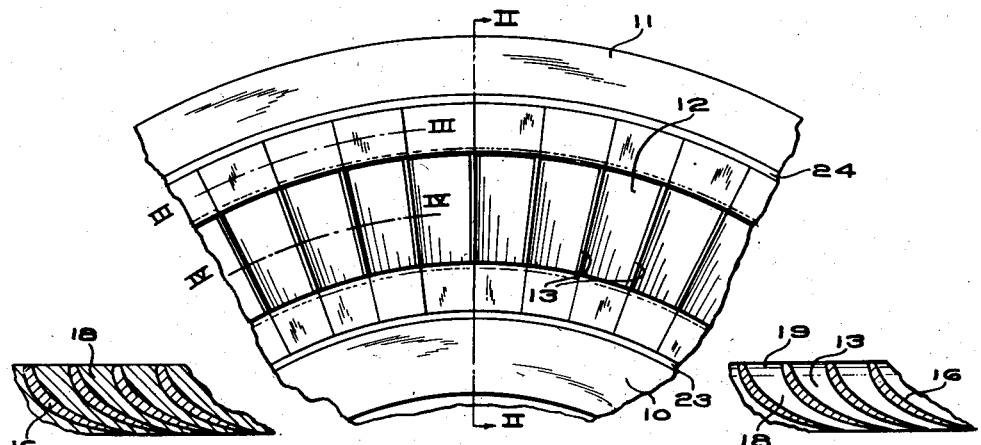
FIG. 3.  FIG. 1.  FIG. 4.
WITNESSES:
James R. Mooser
E. Litz
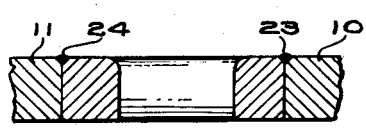
FIG. 2.
INVENTOR
CARL R. SODERBERG.
BY
A. B. Ravis
ATTORNEY Patented Dec. 8, 1936

2,063,707

UNITED STATES PATENT OFFICE 2,063,707

METHOD OF MANUFACTURING TURBINE NOZZLES

Carl R. Soderberg, Swarthmore, Pa., assignor to Westinghouse Electric & Manufacturing Company, East Pittsburgh, Pa., a corporation of Pennsylvania Application June 14, 1935, Serial No. 26,576

5 Claims. (Cl. 29—156.8)

My invention relates to a method for producing an improved type of fabricated nozzle structure for turbines.

The practice has been adopted commercially of fabricating the nozzle construction for turbine nozzle groups or diaphragm nozzle groups, each nozzle group being comprised by a series of elements nested together, the elements being so machined that, when nested together, nozzle passages are formed between adjacent elements. After machining of the elements, they are nested in proper relation and connected at their ends to suitable holding structure. This method of providing the nozzle elements obviously entails a large amount of machine work, as each element is machined from stock to provide all of the necessary faces including the faces which cooperate to define the desired nozzle passages. It is an object of my invention to provide a nozzle group of this general type, while, at the same time, reducing the machining to a minimum and providing for very economical manufacture and assembly. To this end, I provide bar stock to form vane elements and bar stock to form spacer elements, the vane stock being of a section approximately that of a turbine blade or of the ordinary septum wall separating adjacent nozzle passages of a nozzle group, and the spacer stock is formed with convex and concave faces arranged to fit the concave and convex faces, respectively, of the vane stock. The stock is sectioned into suitable lengths to form vane and spacer elements. After machining one end portion of each spacer element to form a desired nozzle entrance surface, a pair of spacer elements is brought into proper relation with respect to a vane element to provide an assembled nozzle member; and, with the spacer elements held to the vane element in any suitable manner, the vane and spacer elements are brazed together. Next, the nozzle members are machined to a sufficient extent to remove surplus brazing material and to provide the desired taper for the nesting of the nozzle members to form an arcuate nozzle group. The nozzle members are nested so that opposed faces of adjacent vane elements and opposed machined end faces of the intervening spacer elements define a nozzle passage, and the inner and outer ends of the nested nozzle members are connected to suitable inner and outer metallic arcuate members in any desired manner, as, for example, by welding. A further object of my invention, therefore, is to provide an improved method of fabricating a nozzle group by the use of the steps specified.

These and other objects are effected by my invention as will be apparent from the following description and claims taken in connection with the accompanying drawing, forming a part of this application, in which:

Fig. 1 is a detail view showing nozzle members nested together and assembled with respect to suitable inner and outer members;

Figs. 2, 3 and 4 are sections taken along the lines II—II, III—III and IV—IV of Fig. 1;

Fig. 5 is a diagrammatic view illustrating vane stock and sections thereof;

Fig. 6 is a section taken along the line VI—VI of Fig. 5;

Fig. 7 is a view similar to Fig. 5 but showing spacer element stock;

Fig. 8 is a section taken along the line VIII—VIII of Fig. 7;

Fig. 9 is a detail view showing radial tapering of the spacer elements;

Fig. 10 is a view showing a spot or tack-weld between the elements of a nozzle member; and Fig. 11 is illustrative of the step of brazing spacer elements to a vane element.

Referring now to the drawing, in Figs. 1 and 2, I show suitable inner and outer arcuate metallic members 10 and 11 together with nozzle members 12 connected to the inner and outer members, the nozzle members being nested together to provide intervening nozzle passages 13 (Figs. 1 and 4).

Instead of providing the nozzle members 12 by machining thereof from stock, I fabricate each nozzle member from sections of suitable bar stock so as to reduce machining to a minimum and effect a high degree of economy of construction. To this end, as shown in Figs. 5 and 7, I provide two types of stock, Fig. 5 showing vane stock and Fig. 7 showing spacing element stock. The vane element stock has a section corresponding to the ordinary section of the septum wall between adjacent passages, that is, it has a section which is quite similar to that of a turbine blade; and the spacing element stock has a section such that the convex and concave faces thereof fit the concave and convex faces, respectively, of the vane element stock. It will be apparent that the vane and spacing element stock have sections which are rather simple and, therefore, the stock may be readily and economically produced by relatively simple metal working operations, for example, by rolling. As indicated in Fig. 5, the vane element stock 15 is cut into sections 16 of the required lengths. Likewise, the spacing element stock 17 is cut into sections 18.

Each spacing element section 18 is machined in a predetermined manner to provide a desired end surface 19 suitable to form an element of the surface of a nozzle passage.

Each vane element 16 and a pair of spacing elements 18 are brought into proper relation, with faces of the spacing elements engaging a face of the vane element, to provide a nozzle member, and the assembly is held together in any suitable manner so as to provide for the brazing operation hereinafter described and which is depended upon to provide brazed connections or metallic bonds between the elements of each nozzle member. Preferably, the elements of each nozzle member are held together in assembled relation by means of tack-welds such as indicated at 20 in Fig. 10. To facilitate making this kind of connection, inner and outer spacing elements are assembled with respect to a vane element, with concave faces of the spacing elements engaging the convex face of the vane element, and the vane element is spot-welded to the spacing elements to an extent sufficient to hold the elements of the nozzle member together to order that the brazing operation hereinafter described may be satisfactorily performed.

The nozzle members with the elements thereof held in properly assembled relation, as hereinbefore described, are next subjected to the brazing process, in order to form metallic connections or bonds between the spacing and vane elements. After cleaning or pickling each nozzle member, the end portions thereof are dipped into any suitable molten brazing compound as indicated at 21 in Fig. 11, the brazing material flowing in between the spacing element and the vane element to form a metallic connection or bond. After brazing one end portion of a nozzle member, the other end portion thereof is brazed. The nozzle members are then machined or cleaned to remove surplus brazing material and to provide for nesting of the nozzle members together. Since the nozzle members 12 extend radially and since the vane elements 16 are preferably of uniform section from end to end, the spacing elements 18 are tapered, as illustrated in Fig. 9, so as to fit properly the outwardly-diverging spaces between adjacent vane elements 16.

The fabricated nozzle members 12 are assembled, as shown in Fig. 1, with respect to inner and outer metallic arcuate members 10 and 11, faces of the spacing elements of each nozzle member engaging faces of vane elements so that, in the nested structure, opposed faces of adjacent vane elements and the adjacent machined end faces of the intervening spacing elements cooperate to define the nozzle passages 13. The nested arrangement of nozzle members is connected to the arcuate members 10 and 11 in any suitable manner, for example, I show welds at 23 and 24 for connecting the end portions of the nozzle members to the metallic members 10 and 11; and, to this end, as indicated in Fig. 9, both the arcuate metallic members and the nozzle members are preferably chamfered as indicated at 25 and 26 to form V-grooves to receive the weld metal.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth in the appended claims.

What I claim is:

1. The method of manufacturing a turbine nozzle group which comprises providing inner and outer metallic arcuate members and metallic vane element and spacing element stock of such section that faces of the spacing element stock are conjugate to faces of the vane element stock, cutting the stock into sections to provide vane and spacing elements, bringing a pair of spacing elements into face engagement with the end portions of each vane element to provide an assembled nozzle member, securing the elements of each nozzle member together, forming brazed connections or metallic bonds between each vane element and its pair of spacing elements, nesting the nozzle members so that the end portions engage in series and so that opposed surfaces of adjacent vane elements and opposed surfaces of intervening spacing elements define nozzle passages, and connecting the ends of the nested nozzle members to the arcuate members.

2. The method of manufacturing a turbine nozzle group which comprises providing inner and outer metallic arcuate members and metallic vane and spacing element stock of such sections that faces of the spacing element stock are conjugate to faces of the vane element stock, cutting the stock into sections to provide vane and spacing elements, bringing a pair of spacing elements into face engagement with the end portions of each vane element to provide an assembled nozzle member, securing the elements of each nozzle member together, forming brazed connections or metallic bonds between the vane and spacing elements thereof, machining the nozzle members so that faces of the vane and spacing elements will rest together in arcuate formation, nesting the nozzle members so that the end portions thereof engage in series and so that opposed surfaces of adjacent vane elements and opposed surfaces of intervening spacer elements define nozzle passages, and connecting the inner and outer ends of the nested nozzle members to the arcuate members.

3. The method of manufacturing a turbine nozzle group which comprises providing inner and outer metallic arcuate members and metallic vane and spacing element stock of such sections that faces of the spacing element stock are conjugate to faces of the vane element stock, cutting the stock into sections to provide vane and spacing elements, machining one end of each of the spacer elements in a predetermined manner to provide desired surfaces, bringing a pair of spacing elements into face engagement with end portions of each vane element with the machined end faces of the spacer elements in opposed relation to provide an assembled nozzle member, tack-welding together the vane and spacing elements of each nozzle member, brazing the end portions of each nozzle member so as to form brazed connections or metallic bonds between the vane and spacing elements thereof, nesting the nozzle members so that end portions engage in series with faces of the spacing elements engaging faces of the vane elements and so that opposed surfaces of adjacent vane elements and opposed machine end surfaces of intervening spacing elements define nozzle passages, and connecting the ends of the nested nozzle members to the arcuate members.

4. The method of manufacturing a turbine nozzle group which comprises providing inner and outer arcuate members and metallic vane and spacing element stock of such sections that faces of the spacing element stock are conjugate to faces of the vane element stock, cutting the stock into sections to provide vane and spacing elements, machining one end of each spacer element to provide a desired end face, bringing a pair of spacing elements into face engagement with machined end faces of the spacing elements in opposed relation to provide an assembled nozzle member, tack-welding the elements of each nozzle member together, forming brazed connections or metallic bonds between the vane and spacing elements thereof, machining the spacing elements of the nozzle members so that the latter will nest together in arcuate formation, nesting the nozzle members so that end portions thereof engage in series with faces of the spacing elements fitting faces of the vane elements and so that opposed faces of adjacent vane elements and opposed machined end surfaces of intervening spacing elements define nozzle passages, and welding ends of the nested nozzle members to the arcuate members.

5. The method of manufacturing a turbine nozzle group which comprises providing inner and outer metallic arcuate members and metallic vane and spacing element stock, the vane element stock having convex and concave faces and the spacing element stock having a concave face conforming to the convex face of the vane element stock, cutting the stock into sections to provide vane and spacing elements, machining the spacing elements to provide each with a desired end surface, bringing a pair of machined spacing elements into engagement with a vane element with concave faces of the spacing elements engaging the convex face of the vane element to provide an assembled nozzle member, spot-welding the vane element of each assembled nozzle member to the spacing elements thereof sufficiently to hold the elements together, forming brazed connections or metallic bonds between the vane and spacing elements thereof, machining the convex faces of the spacing elements of the nozzle members to provide for the latter nesting together in arcuate formation, nesting the nozzle members so that convex faces of the spacing elements engage concave faces of the vane elements and so that exposed concave and convex surfaces of adjacent vane elements and opposed machined end surfaces of intervening spacing elements define nozzle passages, and connecting the ends of the nested nozzle members to the arcuate members.

CARL R. SODERBERG.